United States Patent [19]
Aihara et al.

[11] 4,363,541
[45] Dec. 14, 1982

[54] PHOTOGRAPHING APPARATUS

[75] Inventors: Mamoru Aihara; Yutaka Takahashi; Yoshio Nakajima, all of Hachioji; Tsuyoshi Matsuura, Ina, all of Japan

[73] Assignee: Olympus Optical Company Ltd., Tokyo, Japan

[21] Appl. No.: 192,254

[22] Filed: Sep. 30, 1980

[30] Foreign Application Priority Data

Oct. 5, 1979 [JP] Japan .................. 54/128007

[51] Int. Cl.³ ............................................. G03B 7/093
[52] U.S. Cl. .................................. 354/23 D; 354/51
[58] Field of Search ........................... 354/23 D, 51

[56] References Cited
U.S. PATENT DOCUMENTS

| | | | |
|---|---|---|---|
| 3,842,425 | 10/1974 | Kitai | 354/51 |
| 3,914,776 | 10/1975 | Tsujimoto et al. | 354/51 |
| 4,064,517 | 12/1977 | Maitani et al. | 354/51 |
| 4,158,492 | 6/1979 | Kitaura et al. | 354/51 X |
| 4,176,929 | 12/1979 | Ito et al. | 354/29 |

FOREIGN PATENT DOCUMENTS

| | | |
|---|---|---|
| 2624866 | 8/1977 | Fed. Rep. of Germany . |
| 2843941 | 4/1979 | Fed. Rep. of Germany . |
| 45-81965 | 1/1970 | Japan . |
| 52-147776 | 6/1977 | Japan . |
| 52-133826 | 11/1977 | Japan . |
| 53-70131 | 6/1978 | Japan . |

Primary Examiner—Michael L. Gellner
Attorney, Agent, or Firm—Weinstein & Sutton

[57] ABSTRACT

A photographing apparatus employs a real time photometry technique, and includes a central processing unit to which information concerning the characteristic of a film such as a film speed and other information relating to photographing conditions are supplied through input means. The central processing unit selectively controls the connection of integrating capacitors in an integrating circuit on the basis of such input information, and accurately derives an expected exposure period and the remainder of the exposure period. Also, a display of various information is permitted.

20 Claims, 11 Drawing Figures

PHOTOGRAPHING APPARATUS

BACKGROUND OF THE INVENTION

The invention relates to a photographing apparatus, and more particularly, to such apparatus for use with a microscope.

A variety of photographing apparatus have been proposed and used in practice, but are found to be insufficient in their systematic capability. By way of example, a photographing apparatus for use with a microscope requires the following capabilities:

(a) The ability to take a picture under a flashlight from a xenon light, in addition to a tungsten or halogen lamp;

(b) The capability to permit the use of a variety of films including 35 mm film, 6 cm×9 cm Brownie film, instant photography film and 16 mm film;

(c) To permit either automatic or manual exposure;

(d) The provision of an intervalometer which controls the number of picture frames which are to be taken during a given period of time;

(e) The provision of a printer which records the photographing conditions, for example, film speed, a correction of a sample density distribution, an actual exposure period, a sample number or the like;

(f) The capability to calculate and display an expected exposure period;

(g) The ability to determine and display the remainder of the exposure period;

(h) To permit the display of an actual exposure period.

However, a conventional photographing apparatus for use with a microscope is provided with only part of the above capabilities.

In addition, a photographing apparatus for use with a microscope may be required to take a picture under a very weak or a very strong illumination of an object being photographed. In these circumstances, the failure of Bunsen-Roscoe's reciprocity law occurs, necessitating a corresponding correction. In such instance, the exposure period will increase, making it necessary to calculate and display an expected exposure period and the remainder of the exposure period. In the prior art, there has been no arrangement which provides an accurate display of such exposure periods in a digital manner.

When the exposure period increases for the reasons mentioned above, the brightness of an object being photographed may frequently change during the course of the photographing operation. It is also necessary to calculate an accurate, expected exposure period and the remainder of the exposure period if the brightness changes in such a manner. However, a conventional photographing apparatus which utilizes a stored and fixed photometric value is unable to provide an accurate indication of the expected exposure period under the varying illumination.

SUMMARY OF THE INVENTION

It is an object of the invention to eliminate the above disadvantages of the prior art by providing a photographing apparatus which utilizes real time or direct photometry to permit an accurate determination of an exposure period under varying illumination of an object being photographed. Information concerning film response, such as film speed and other related photographing information, are supplied to permit a calculation and a digital display of an expected exposure period or the remainder of an exposure period in order to provide a correction of the failure of the reciprocity law, thus covering a broad range from a low to a high illuminance and allowing a display of various information supplied.

In accordance with the invention, the use of the real time photometry permits the brightness of an object being photographed to be monitored continuously during the course of the photographing operation. Hence, if the brightness changes, the change can be immediately detected. In addition, film speed information or correction factors which correct for the failure of the reciprocity law are supplied to permit an accurate calculation of an expected exposure period or the remainder of an exposure period. A photometry over an increased range is permitted, and various information can be displayed.

DESCRIPTION OF THE PREFERRED EMBODIMENT

Figure 1:
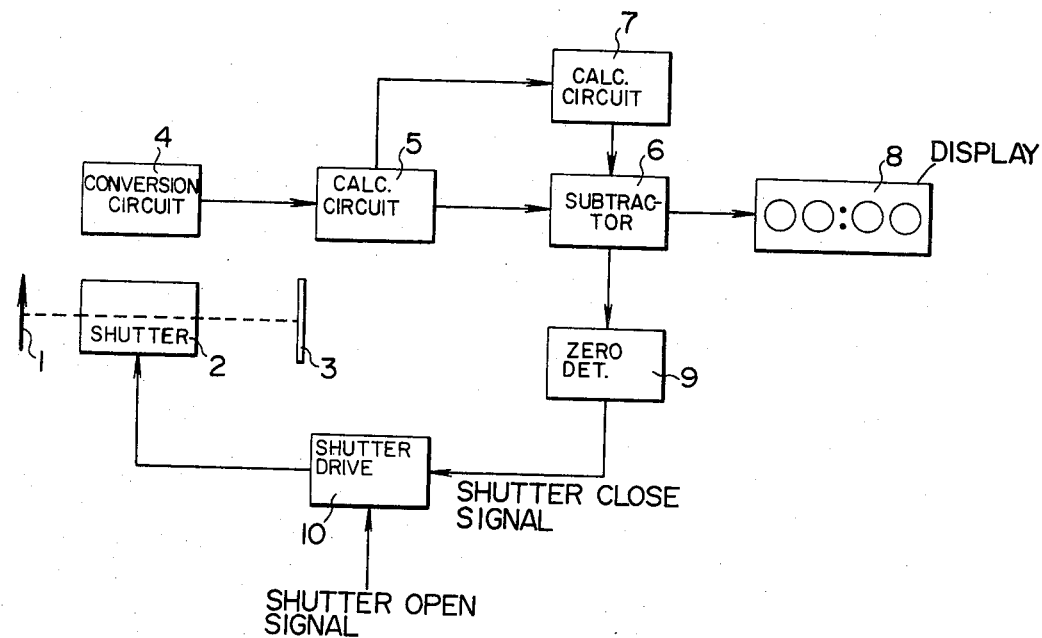
FIG. 1 is a block diagram of a basic arrangement of a photographing apparatus according to the invention.

Referring to FIG. 1, there is shown a basic arrangement of a photographing apparatus according to the invention in a block diagram. The image of an object 1 to be photographed is projected through an optical system (not shown) such as an objective lens and a shutter 2 onto a film 3.

The brightness of the object 1 is determined by a photoelectric conversion circuit 4 including a photoelectric transducer element such as silicon photodiode, which provides an electrical signal proportional to the brightness for supply to a calculation circuit 5. The output signal from the conversion circuit 4 is generally in the form of an integrated voltage formed by an integrating circuit, not shown, which integrates a photocurrent from the transducer element, and corresponds to the product of the illuminance and time or the amount of exposure supplied. In the course of a photographing operation, an expected exposure period which will be required to achieve a desired exposure is determined by the calculation circuit 5 on the basis of the amount of exposure. Then, an equivalent exposure period is determined which represents the elapsed exposure period at the time the expected exposure period is determined, and is subtracted from the expected exposure period to derive the remainder of the exposure period. The time when the remainder of the exposure period reaches zero is detected, and an exposure termination signal is then produced to close the shutter, thus terminating the exposure. Specifically, the expected exposure period which is calculated by the calculation circuit 5 is supplied to a subtractor 6, and the calculation circuit 5 also supplies time information indicative of the time when the expected exposure period has been determined to another calculation circuit 7 which calculates the equivalent exposure period, which is then supplied to the subtractor 6. The subtractor 6 then subtracts the equivalent exposure period from the expected exposure period to derive the remainder of the exposure period, which is fed to a zero detector 9 and to a display 8 which then displays the remaining exposure period. The zero detector 9 monitors the remainder of the exposure period supplied from the subtractor 6 to detect the time when it reaches zero. When zero is detected, the zero detector 9 produces a shutter close signal, which is supplied to a shutter driver circuit 10. It will be understood that a shutter open signal has been supplied to the shutter drive circuit 10 in response to the depression of a shutter release button, and hence the shutter 2 is maintained open. When the shutter close signal is supplied to the shutter drive circuit 10 from the zero detector 9 in the manner mentioned above, the shutter drive circuit 10 closes the shutter 2, thus terminating a photographing operation.

Figure 2:
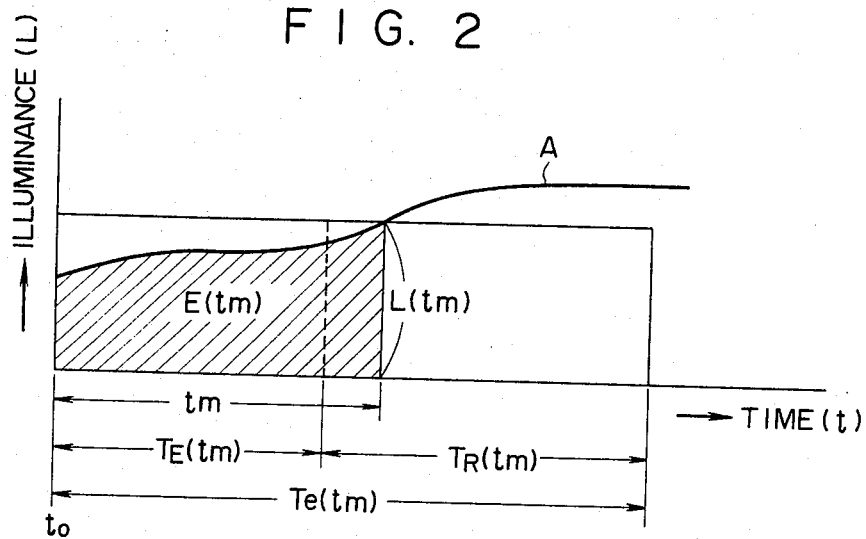
FIG. 2 graphically shows an expected exposure period, an equivalent exposure period and the remainder of an exposure period as functions of illuminance and time.

Referring to FIG. 2, the relationship between the expected exposure period, the equivalent exposure period and the remainder of the exposure period as well as equations applicable to their derivation will be described. It is assumed that the exposure is initiated at time $t_0$, and it is desired to calculate an expected exposure period $T_e(t_m)$ at time $t_m$.

Generally, the exposure period T is related to the illuminance L under given photographing conditions as follows:

$$T = K/L \tag{1}$$

where K represents a constant.

Representing the illuminance at time $t_m$ by $L(t_m)$, an expected exposure period $T_e(t_m)$ under general photographing conditions will be given by the following equation:

$$T_e(t_m) = K/L(t_m) \tag{2}$$

It will be noted that this represents an expected exposure period when the illuminance $L(t_m)$ remains constant. However, the illuminance $L(t)$ in actuality changes as indicated by a curve A. Accordingly, the real time photometry must take such change in the illuminance $L(t)$ into consideration. To cope with this problem, the present invention derives an equivalent exposure period. Specifically, an amount of exposure $E(t_m)$ at time $t_m$ (hatched area in FIG. 2) is determined, and is divided by the illuminance $L(t_m)$ at time $t_m$ to provide a quotient, which represents an equivalent exposure period $T_E(t_m)$, namely, $$T_E(t_m) = E(t_m)/L(t_m) \tag{3}$$

The remainder of the exposure period $T_R(t_m)$ can be obtained by subtracting the equivalent exposure period $T_E(t_m)$ from the expected exposure period $T_e(t_m)$. In other words, $$T_R(t_m) = T_e(t_m) - T_E(t_m) \tag{4}$$

$$= T_e(t_m) - \frac{E(t_m)}{L(t_m)}$$

In accordance with the invention, the expected exposure period is sequentially derived during the course of the exposure. Representing the illumination at each instant by $L(t_1), L(t_2) \ldots L(t_m)$ which are spaced apart by time intervals of $\Delta t_1, \Delta t_2 \ldots \Delta t_m$, the equation (4) can be rewritten as follows:

$$T_R(t_m) = T_e(t_m) - \frac{\sum_{i=1}^{m} L(t_i) \times \Delta t_i}{L(t_m)} \tag{5}$$

A signal representing the remainder of the exposure period $T_R(t_m)$ which is derived in the manner mentioned above is sequentially fed to the display 8 of FIG. 1, providing an indication in the form of 00 minutes 00 seconds, for example. Simultaneously, the signal is also fed to the zero detector 9, which detects the time when the remainder of the exposure period reaches substantially zero, whereupon it produces an exposure termination signal which is fed to the shutter drive circuit. As mentioned previously, the shutter drive circuit closes the shutter 2 to terminate the exposure in response to the termination signal.

Since the exposure period is established on a real time basis according to the invention, a proper exposure can be determined, taking into consideration a variation in the brightness of the object 1 being photographed. In addition, the remainder of the exposure period can be displayed during the course of the photographing operation. As will be apparent from the foregoing description, the remainder of the exposure period is determined by taking the brightness of the object 1 being photographed into consideration, and is therefore very accurate.

Figure 3:
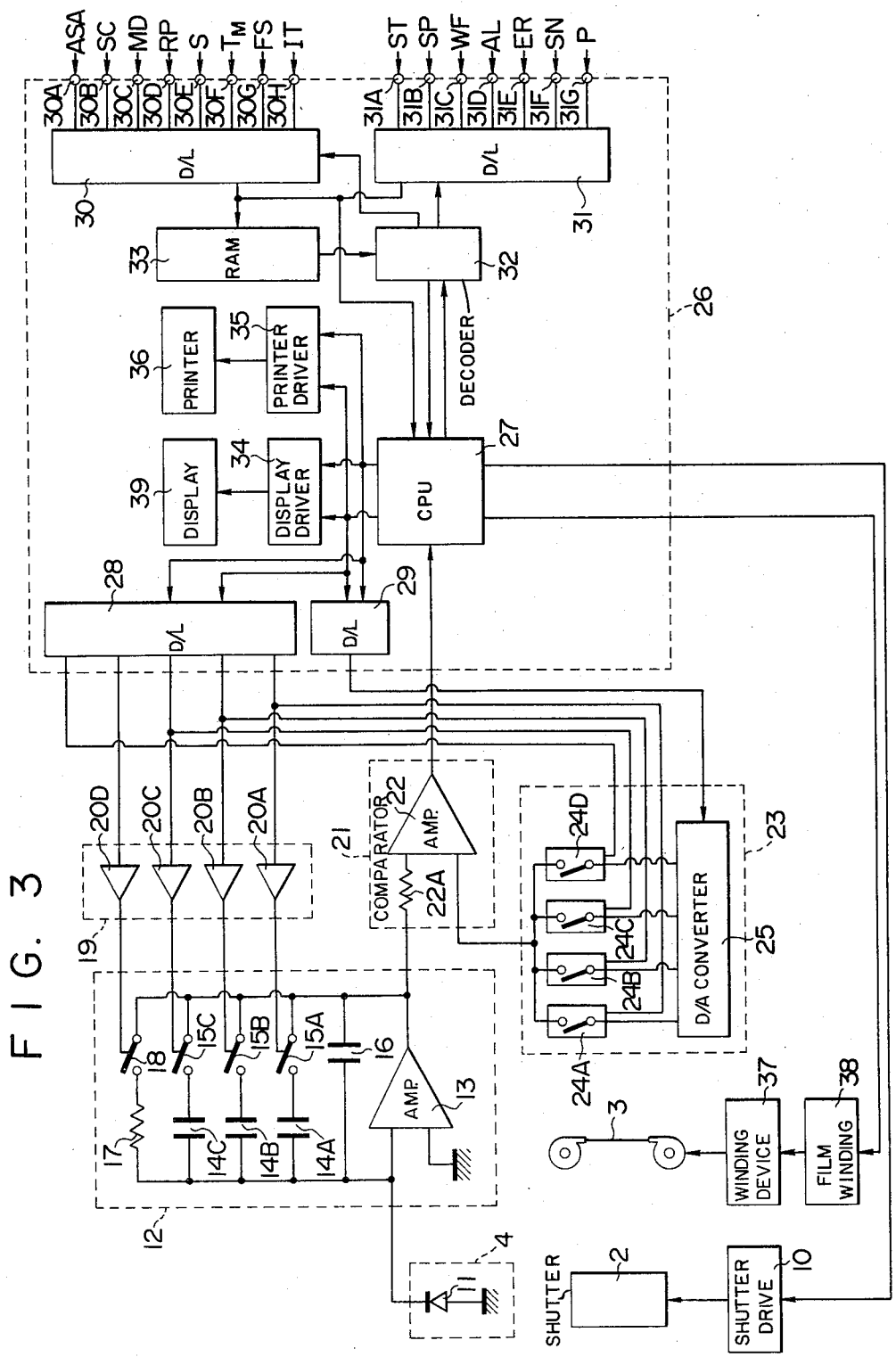
FIG. 3 is a schematic diagram of a photographing apparatus according to one embodiment of the invention.

FIG. 3 is a block diagram of the entire arrangement of a photographing apparatus according to one embodiment of the invention. It is to be understood that the apparatus is designed for use with a microscope. Referring to FIG. 3, the photoelectric conversion circuit 4 is indicated by a phantom line block. It includes a silicon photodiode 11 as a transducer element, which has its anode connected to the ground. The cathode of the photodiode 11 is connected to one input of an operational amplifier 13 which represents one component of an integrating circuit 12. The other input of the operational amplifier 13 is connected to the ground. The integrating circuit also includes a main or fixed integrating capacitor 16 connected across the one input and the output of the operational amplifier 13, and which is shunted by a plurality of series circuits each including a switch 15A and an integrating capacitor 14A, a switch 15B and an integrating capacitor 14B, and a switch 15C and an integrating capacitor 14C. The main capacitor 16 is also shunted by a series combination of a resistor 17 and a switch 18. It will be understood that, by selectively operating the switches 15A to 15C, any one of additional integrating capacitors 14A to 14C may be connected in circuit with the main capacitor 16. The output of the operational amplifier 13 is connected through a resistor 22A to one input of an operational amplifier 22, the other input of which is supplied with a reference voltage, whereby the operational amplifier 22 operates as a voltage comparator 21 together with resistor 22A, comparing the output voltage from the operational amplifier 13 against the reference voltage. The output of the operational amplifier 22 is connected to a central processing unit (CPU) 27 which represents one component of a calculation control circuit 26.

The calculation control circuit 26 also comprises decoder/latches 28, 29, 30, 31, a random access memory (RAM) 33, an address decoder 32, a display driver 34, a display 39, a printer driver 35 and a printer 36. CPU 27 includes a memory which stores a program and a temporary memory which stores data, and can be easily implemented in the form of a usual microcomputer. Under the program control, CPU 27 supplies an address and data through the address decoder 32 to the decoder/latches 30, 31, whereby various information externally supplied to the decoder/latches 30, 31 may be entered into the CPU 27 either through RAM 33 and the address decoder 32 or directly. The information supplied is processed together with information which is supplied from the operational amplifier 22. Also, by feeding a control command to the decoder/latches 28, 29, the CPU 27 is capable of controlling the switches 15A to 15C and 18 as well as a reference voltage generator 23, which will be described later. Additionally, the CPU 27 supplies a control command and various data which is obtained as a result of the calculation performed therein to the display driver 34 and the printer driver 35, thus allowing such data or information to be displayed or printed by the display 39 and the printer 36.

It is to be understood that in the integrating circuit 12, the switches 15A to 15C and 18 are implemented as relay switches (coils being not shown) or CMOS analog switches, which are operated in response to a control command which is fed from the CPU 27 through the decoder/latch 28 and which selectively activates one or more of switch drivers 20A to 20D contained in a switch drive circuit 19. When these integrating capacitors 14A to 14C are selectively connected in circuit with the integrating circuit 12, the integrating interval is changed to permit the expected exposure period to be determined within a reduced time, in a manner to be described in more detail later. When the switch 18 is closed, the integrated voltage across the integrating capacitors 14A to 14C, 16 can be discharged through the resistor 17.

The other input of the operational amplifier 22 is connected to receive a reference voltage from the reference voltage generator 23 so that the output voltage from the operational amplifier 13 of the integrating circuit 12 can be compared against the reference voltage. The reference voltage generator 23 includes a digital-analog converter 25 which receives digital information concerning a reference voltage from the CPU 27 through the decoder/latch 29 and converts such information into a corresponding analog signal. The analog signal is fed to the other input of the operational amplifier 22 through switches 24A to 24D, which are again in the form of relay switches (coils being not shown) or CMOS analog switches. Again, these switches are operated in response to a control signal which is fed from the CPU 27 through the decoder/latch 28. It is to be noted that the switches 24A to 24C are operated in a manner corresponding to the closure of the switches 15A to 15C in the integrating circuit 12 so that a reference voltage which corresponds to a particular one or ones of the integrating capacitors 14A to 14C which are connected in circuit with the operational amplifier 13 is supplied to the operational amplifier 22 from the reference voltage generator 23. The switch 24D is closed to supply a reference voltage to the operational amplifier 22 when the main integrating capacitor 16 alone is connected in the integrating circuit 12.

The CPU 27 also supplies a control command to the shutter drive circuit 10 in order to control the opening and closing of the shutter 2. Also, it supplies a control command to a film winding drive circuit 38 in order to control a winding operation of the film 3 by an automatic winding device 37.

The decoder/latches 30, 31 include a plurality of input terminals 30A to 30H and 31A to 31G, respectively, for supplying various input information to the CPU 27 in order to permit a variety of photographing conditions to be established. Such input information will be specifically described below.

Film speed information ASA ... This information is supplied through the input terminal 30A and represents an ASA film speed of the film 3 being used. Film speed in a range from ASA 6 to 6400 can be supplied.

Figure 4:
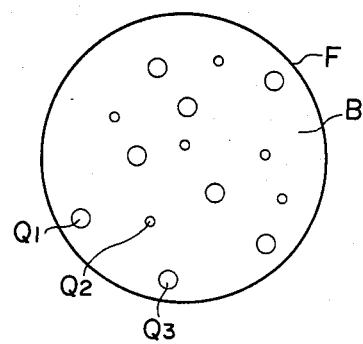
FIG. 4 is a diagram illustrating a sample density distribution which represents one of the photographing conditions.

Sample density distribution correction factor information SC ... This information is supplied through the input terminal 30B, and represents a correction factor which is used to enable a proper exposure of an object being photographed which is under an increased or reduced illumination as compared with the background of the field when the entire field is subject to photometry. By way of example, FIG. 4 illustrates a field F including a background B of an illuminance $L_1$ and having an area $W_1$. n objects $Q_i (i=1, 2 \ldots n)$ have respective illuminances $L_{2i}$ and areas $W_{2i}$. Then, the total area W and the total illuminance $L_T$ can be determined as follows:

$$W = W_1 + \sum_{i=1}^{n} W_{2i} \tag{6}$$

$$L_T = L_1 W_1 + \sum_{i=1}^{n} L_{2i} \cdot W_{2i} \tag{7}$$

Consequently, the illuminance L per unit area is given as follows:

$$L = \frac{L_T}{W} = \frac{L_1 W_1 + \sum_{i=1}^{n} L_{2i} \cdot W_{2i}}{W} \tag{8}$$

Assuming that the value of $L_{2i}$ is uniform everywhere and has a value $L_2$ and the total area of objects being photographed is equal to $W_2$, the equation (8) can be rewritten as follows:

$$L = (L_1 W_1 + L_2 W_2)/W \tag{9}$$

The correction factor SC which is employed to take a picture of $L_2$ with a proper exposure is given as follows:

$$SC = L_2/L = WL_2/(L_1 W_1 + L_2 W_2) \tag{10}$$

Photographing mode information MD .... This information is supplied through the input terminal 30C, and indicates whether an automatic or a manual mode is employed.

Correction constant for the failure of reciprocity law RP . . . This information is supplied through the input terminal 30D. The failure of the reciprocity law occurs for a very weak light or very strong light where the relative sensitivity of the film is reduced. It typically occurs in a flash photography in which an exposure is achieved for a brief time with a strong spark light source or in a photographing of stars through an astronomical telescope over an increased length of time or in a photographing of a sample under reduced illumination over an increased exposure period through a microscope. In particular, when photographing an object under a very bright illumination or under a very dark illumination to require an exposure period less than 1/1000 second or greater than one-half second, the reaction of the film is not proportional to the product of the illuminance and the exposure period or the amount of exposure, preventing a photograph of a proper density from being obtained. In this instance, a correction for the failure of the reciprocity law must be made.

The failure of the reciprocity law depends on the kind of the film being used. Representing a corrected exposure period by $T'_e$, and an exposure period in a region where the photochemical reaction of the film is proportional to the amount of exposure or in a region where the reciprocity law prevails (hereafter referred to as a linear region) by $T_e$, there is the following relationship between the both parameters:

$$T_e = \alpha T_e'^\beta$$

In this equation, both parameters $\alpha$ and $\beta$ are constants which depend on the kind of the film. Hence, $\alpha$ and $\beta$ correspond to the correction factors. While these correction factors $\alpha$, $\beta$ may be directly supplied to the apparatus, in the present embodiment, to avoid a practical difficulty, the values of the correction factors are stored in the internal memory of the CPU 27 in a manner corresponding to the individual films, and by supplying information which indicates the kind of the film being used, the CPU 27 is enabled to retrieve the correction factors $\alpha$, $\beta$ which corresponds to the film used.

Film size compensation factor S . . . This information is supplied through the input terminal 30E. For example, choosing 35 mm film as the basis or unity, the compensation factor for the Brownie film which measures 6 cm × 9 cm is equal to 6.3 while the compensation factor for 16 mm film is equal to 0.3. In this manner, a compensation factor is supplied for a varying size of the film being used. However, since it is practically troublesome to supply a compensation factor information S depending on the size of the film used, the kind of the film used is specified to permit a corresponding compensation factor to be derived.

Manual mode exposure period information $T_M$ . . . . This information is supplied through the input terminal 30F, and is utilized to establish an exposure period when a manual photographing mode is selected.

Flash photography information FS . . . . This information is supplied through the input terminal 30G to establish an exposure period of 100 microseconds, for example, automatically for the flash photography. However, if required, a desired exposure period may be supplied through the input terminal 30F which is used to supply the manual mode exposure period information $T_M$.

Intervalometer control information IT . . . . This information is supplied through the input terminal 30H, and is utilized to preset an intervalometer so as to instruct the number of picture frames which are taken at a given time interval whenever a long 35 mm film or a cine camera is employed.

The above information is supplied to the decoder/latch 30, and principally relate to photographing conditions. Information which is supplied to the decoder/latch 31 will now be described, and principally relate to instructions to control the operation of the calculation control circuit 26.

Initiation command information ST . . . . This information is supplied through the input terminal 31A, and triggers the operation of the photographying apparatus.

Stop command information SP . . . . This information is supplied through the input terminal 31B, and functions to stop the operation of the photographing apparatus. The stop command may be issued after the initiation command has been supplied and in the course of a photographing operation if it is desired to halt the operation of the photographing apparatus urgently, as a result of the recognition that a wrong information signal has been supplied to one or more of the terminals 30A–30H. Alternatively, the stop command may be supplied at a given time interval after the supply of the initiation command so that a picture can be taken within a predetermined exposure period when a manual photographing mode is selected.

Winding command information WF . . . . This information is supplied through the input terminal 31C, and is supplied to the CPU 27 to control the winding drive circuit 38 so that the automatic winding device 37 associated with the film 3 is energized to wind up the film 3. An automatic film winding takes place after each frame of the picture has been taken, and is also utilized during an initial film loading into the camera in order to wind up a leader portion of the film corresponding to several frames.

Automatic exposure fixing command information AL . . . . This information is supplied through the input terminal 31D, and when it is supplied to the apparatus, the initial frame is taken in an automatic exposure, and the second and subsequent frames are taken under the same exposure conditions as the initial frame. The automatic exposure fixing command AL is used in forming a montage photograph, and can be used, for example, in taking a picture with a microscope when it is desired to take a picture of a greater extent than the field through the movement of the stage of the microscope while maintaining the magnification of the objective fixed. If such a photographing operation takes place in an automatic exposure mode, each picture will be taken with the proper exposure, but it is the purpose of a montage photograph to take pictures on the basis of the brightness of a particular field which is chosen as the reference in order to know a variation of the brightness in the sample. To this end, the automatic exposure fixing command AL is effectively used.

Real exposure period read command information ER . . . . This information is supplied through the input terminal 31E, and is used to read the actual exposure period to be indicated on the display 39. Specifically, the calculation control circuit 26 determines the real exposure period from the opening until the closing of the shutter 2, and this real exposure time can be displayed on the display 39 whenever this information is supplied.

Sample number information SN . . . . This information is supplied through the input terminal 31F, and indicates the number of the sample which is being photographed.

Print command information P . . . . This information is supplied through the input terminal 31G, and when it is supplied, the CPU 27 issues a print instruction to the printer driver 35, whereby various data including the number of sample, the real exposure period, and the identification of the film used is printed out.

Various information described above is supplied through the input terminals 30A-30H and 31A-31G and through the decoder/latches 30, 31 to the CPU 27, which in turn controls the various portions of the photographing apparatus based upon such information.

In operation, when the initial command information ST is supplied to the CPU 27 through the input terminal 31A, the CPU 27 activates the shutter driver 10 to open the shutter 2, thus initiating a photographing operation. The photoelectric transducer element 11 of the photoelectric conversion circuit 4 determines light from an object being photographed, with its photocurrent being supplied to the integrating circuit 12. The integrating circuit 12 integrates the photocurrent by a selected combination of the main capacitor 16 and additional capacitors 14A-14C. The integrated voltage is fed to the voltage comparator 21, which compares it against the reference voltage supplied from the reference voltage generator 23. If the integrated voltage exceeds the reference voltage as a result of such comparison, the operational amplifier 22 changes its output signal, which is supplied to the CPU 27. The change in the output signal allows the CPU 27 to recognize the exposure period.

The photographing apparatus of the invention sequentially calculates the displays and expected exposure period and the remainder of the exposure period during the course of the exposure lasting for an increased length of time. The calculation of the expected exposure period and the remainder of the exposure period will now be described.

To calculate the expected exposure period and the remainder of the exposure period, it is necessary to enable such calculation to be completed within a reduced length of time by sequentially changing the connection of the additional integrating capacitors 14A-14C in the integrating circuit 12 and also changing the reference voltage supplied from the reference voltage generator 23 in accordance with the connection of these integrating capacitors in the circuit of FIG. 3, by taking into consideration the film speed, the illuminance and other factors. It will be appreciated that the derivation of the exposure period within a reduced length of time is achieved by reducing the effective capacitance formed by the integrating capacitors 14A-14C, 16 of the integrating circuit 12 to determine the time when the integrated voltage reaches the reference voltage. in the previous description of the principle of the invention made in connection with FIGS. 1 and 2, it has been described that the exposure period T is related to the illuminance L by the equation (1). However, in practice, it is necessary to determine the exposure period in consideration of the response of the film used. By representing the film speed in ASA designation by $ASA_O$, the compensation factor for the film size by $S_O$ and the sample density distribution correction factor by $SC_O$, the equation (1) can be rewritten as follows:

$$T = \frac{K}{L} \times \frac{S_O}{ASA_O \times SC_O} \tag{11}$$

Assume now that the exposure period T represents an exposure period $T_e$ in the linear region. One or more integrating capacitors are connected in the integrating circuit 12 to provide a capacitance C, and it is assumed that the photoelectric transducer element 4 produces a current $I = kL$ (where k is a constant) which is proportional to the illuminance L impinging upon the transducer element 11. When the current I is supplied to the integrating circuit 12, it produces an output voltage V which is indicated as follows:

$$V = (I/C)t \tag{12}$$

Figure 5:
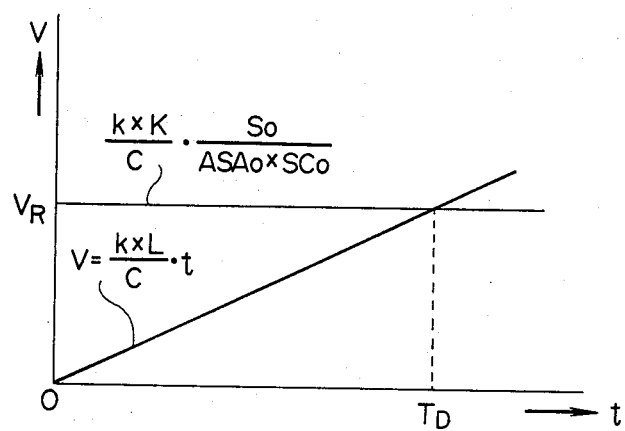
FIG. 5 graphically shows an output voltage of the integrating circuit shown in FIG. 3 as a function of time.

This relationship is graphically illustrated in FIG. 5, and it will be noted that the output voltage V from the integrating circuit 12 increases linearly with time t. A time $T_D$ required for the output voltage to reach a reference voltage $V_R$ represents a proper exposure period. It will be seen that the capacitance C of the integrating circuit and the reference voltage $V_R$ may be selected so that from the equations (11) and (12), the following equality applies:

$$\begin{aligned} T_D &= \frac{K}{L} \times \frac{S_O}{ASA_O \times SC_O} \\ &= \frac{kK}{I} \times \frac{S_O}{ASA_O \times SC_O} \\ &= \frac{CV_R}{I} \end{aligned} \tag{13}$$

In other words, the above equation may be modified as follows:

$$CV_R = k \times K \times \frac{S_O}{ASA_O \times SC_O} \tag{14}$$

It will be seen from the equation (13) that the time required for the output voltage from the integrating circuit 12 to reach the reference voltage $V_R$ will be shorter with a smaller value of the capacitance C. Hence, for an increased length of the exposure period, a reduced capacitance of the integrating capacitor may be chosen, thus determining a range of time which can be determined. The selected capacitance and the time determined are used to derive an expected exposure period.

A procedure to calculate an expected exposure period by a sequential selection of the capacitance of the integrating capacitors will now be described. As mentioned previously, the integrating capacitors are selected by selectively connecting the switches 15A-15C in accordance with a control signal supplied from the CPU 27. The capacitance is changed from a larger to a smaller value in a sequential manner. It is to be understood that the capacitance of the capacitors is grouped so as to correspond to different ranges of film speeds.

Figure 6:
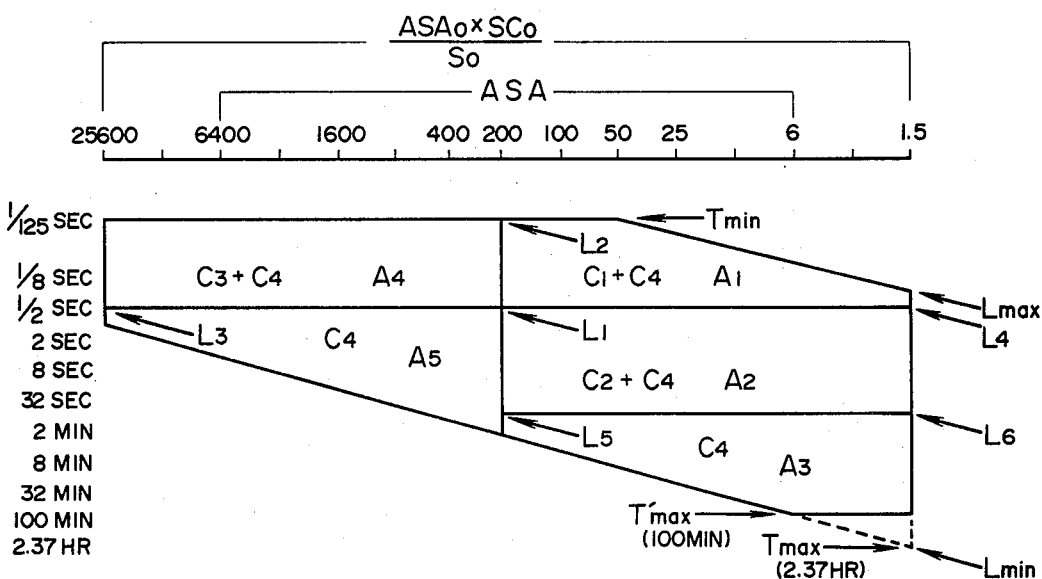
FIG. 6 is a diagram illustrating the relationship among the film speed, the exposure period, the illuminance and the capacitance of the integrating capacitor.

FIG. 6 diagrammatically illustrates the relationship among the film speed, the capacitance of the integrating capacitor or capacitors, the exposure period and the illuminance. In this diagram, the film speed is indicated in terms of ASA values as well as modified film speed designation which is obtained by correcting the ASA value with the sample density distribution correction factor SC and the film size compensation factor S, which range from 1.5 to 25,600 (hereafter, this designation is referred as ASA film speed). The ordinate represents the exposure period from 1/125 second to 2.37 hours on the left-hand side, and the illuminance L is indicated by lines extending obliquely upward from right to left. It is to be understood that each line indicates a constant value of the illuminance L. A line indicating the maximum illuminance $L_{max}$ is located topmost while a line indicative of the minimum illuminance $L_{min}$ is located bottommost. The diagram is divided into a plurality of regions $A_1-A_5$ which can be determined by each selected combination of the integrating capacitors 14A-14C, 16 in the integrating circuit 12 in FIG. 3. The region $A_1$ corresponds to a range of ASA film speed from 1.5 to 200, a range of the illuminance from $L_{max}$ to $L_1$ and an exposure period from 1/125 second to $\frac{1}{2}$ second. The region $A_2$ corresponds to an ASA film speed from 1.5 to 200, an illuminance from $L_4$ to $L_5$, and an exposure period from $\frac{1}{2}$ second to 1 minute. The region $A_3$ corresponds to an ASA film speed from 1.5 to 200, an illuminance from $L_6$ to $L_{min}$, and an exposure period from one to one hundred minutes. The region $A_4$ corresponds to an ASA film speed from 200 to 25,600, an illuminance from $L_2$ to $L_3$, and an exposure period from 1/125 second to $\frac{1}{2}$ second. Finally, the region $A_5$ corresponds to an ASA film speed from 200 to 25,600, an illuminance from $L_1$ to $L_{min}$, and an exposure period from $\frac{1}{2}$ second to 2 minutes.

A particular combination of integrating capacitors 14A-14C and 16 which is used in a particular region is also indicated in this diagram. Specifically, representing the capacitance of the capacitors 14A to 14C and 16 by $C_1$, $C_2$, $C_3$ and $C_4$, respectively, the CPU 27 controls the combination of integrating capacitors in the integrating circuit 12 as shown in FIG. 6. Specifically, a combination of $C_1+C_4$ is used for the region $A_1$, a combination of $C_2+C_4$ for the region $A_2$, $C_4$ alone for the region $A_3$, a combination of $C_3+C_4$ for the region $A_4$, and $C_4$ alone for the region $A_5$. In an example, $C_1+C_4=0.18$ $\mu F$, $C_2+C_4=7200$ pF, $C_3+C_4=1500$ pF, and $C_4=60$ pF. Then the following ratios are obtained:

$$C_1+C_4:C_2+C_4:C_4 = 1:1/25:1/3000 \quad (15)$$

$$C_3+C_4:C_4 = 1:1/25 \quad (16)$$

As will be apparent from FIG. 6, for the ASA film speed from 1.5 to 200, the CPU controls the connection of integrating capacitors in the integrating circuit 12 in a sequential manner of $C_1+C_4$ to $C_2+C_4$ to $C_4$ to determine an expected exposure period. For the ASA film speed from 200 to 25,600, the capacitance is changed in the sequence of $C_3+C_4$ to $C_4$ to determine an expected exposure period. It will be appreciated that such change of the capacitance of the integrating capacitors is achieved by selectively operating the switches 15A to 15C under the control of the CPU 27. Assuming that the ASA film speed information from 1.5 to 200 is supplied through the input terminal 30A, the CPU 27 initially closes the switch 15A through the decoder/latch 28 and the switch driver 20A, connecting the integrating capacitor 14A across the input and the output of the operational amplifier 13 to provide a composite capacitance of $C_1+C_4$ which corresponds to the region $A_1$. When an integrated voltage with this capacitance cannot reach the reference voltage within 0.5 second, the CPU 27 detects this fact, and then operates to close the switch 18 through the decoder/latch 28 and the switch drive circuit 19, thus discharging the integrating capacitors 14A and 16 through the switch 18 and the resistor 17. Subsequently, it opens the switch 15A, and closes the switch 15B instead to provide a composite capacitance of $C_2+C_4$, formed by the integrating capacitors 14B and 16, which corresponds to the region $A_2$, reinitiating an integrating operation. As the region is changed from $A_1$ to $A_2$, the capacitance changes from $C_1+C_4$ to $C_2+C_4$. Considering the ratio of capacitances, it is seen that the capacitance of $C_2+C_4$ is lower than that of $C_1+C_4$ by a factor of 25, as indicated in the equation (15). Consequently, when the reduced capacitance is used in an integrating operation, the integrated voltage increases as rapidly as 25 times the previous rate, reaching the reference voltage level at an earlier time. Hence, an exposure period thus determined may be multiplied by 25 to provide an actual, expected exposure period. If the integrated voltage does not reach the reference voltage level within 2.4 seconds in the operating region $A_2$, or when it does not reach the reference voltage after one minute which is 25 times 2.4 seconds to represent an actual exposure period, the operating region is further changed for photometry from $A_2$ to $A_3$ in the manner mentioned above, thus further reducing the capacitance by a factor of 3000, as indicated in the equation (15). For the ASA film speed from 200 to 25,600, the same procedure is employed.

Considering the establishment of the reference voltage, the reference voltage is established so that an integrated voltage reaches the reference voltage in 0.5 seconds for the ASA value of 200 and the illumination of $L_1$ in the operating regions $A_1$ to $A_3$. With this reference voltage, the exposure period will be 1/125 second for the illuminance of $L_2$ and the ASA value of 200. In the operating regions $A_4$ and $A_5$, the reference voltage is established so that the integrated voltage reaches the reference level in 1/125 second for the illuminance $L_2$ and the ASA value of 200 and reaches the reference value in 0.5 seconds for the illuminance $L_3$ and the ASA value of 25,600. However, in the operating regions $A_1$ and $A_4$, assuming that $C_1+C_4 \neq C_3+C_4$, the reference voltage is established so that the reference value $V_{RL}$ for an ASA value less than 200 ($ASA_L$) and the reference value $V_{RM}$ for an ASA value not less than 200 ($ASA_H$) satisfies the following equality:

$$\frac{V_{RL}}{V_{RM}} = \frac{(C_3+C_4) \times ASA_H}{(C_1+C_4) \times ASA_L} \quad (17)$$

Considering the dynamic range of the photometry, it is seen from FIG. 6 that the ratio of the maximum illuminance $L_{max}$ and the minimum illuminance $L_1$ which can be determined in the region $A_1$ is equal to $2.5 \times 10^2$ while the ratio of the maximum illuminance $L_2$ and the minimum illuminance $L_3$ which can be determined in the region $A_4$ is equal to $8 \times 10^3$. The ratio of the maximum illuminance $L_{max}$ and the minimum illuminance $L_{min}$ which can be determined in the entire region is equal to $25,600 \times 2/50 \times 1/125 = 1.28 \times 10^{50}$, a very large figure. Theoretically, a ratio of the maximum exposure period and the minimum exposure period is $2.37 \times 60 \times 60/(1/125) \approx 10 \times 10^{15}$. However, for practical purposes, an exposure period in excess of two hours is insignificant, and hence the maximum exposure period $T'_{max}$ is chosen equal to 100 minutes. The exposure period $T_f$ which is used during a flash photography is equal to 100 microseconds as mentioned previously. Choosing this value as the minimum exposure period, $T_{max}/T_f$ is equal to $8.5 \times 10^7$, again a very large figure. In this manner, the dynamic range of the illuminance which can be determined by photometry is greatly increased as is the exposure period.

The data illustrated in FIG. 6 is tabulated in the following table where the expected exposure period $T_e$, the photometric technique, the integrating time $T_c$, and the equation used to calculate the expected exposure period $T_e$ are shown as a function of the value of the ASA film speed, the capacitance of the integrating circuit and the operating regions. In this table, a direct integration is indicated under the column of the photometry technique since it is useless to indicate an expected exposure period or the remainder of the exposure period when the exposure period is less than 0.5 seconds. In such an instance, no calculation is made, and instead the direct integration is employed. For an exposure period in excess of 0.5 seconds, an integrating interval is determined by utilizing an integrating capacitor or capacitors of a reduced capacitance, and an expected exposure period is calculated from the integrating interval using the equation indicated.

period for the region $A_1$, the CPU 27 feeds a signal to the switch drive circuit 19 through the decoder/latch 28 to close the switch 18, thus discharging the capacitors 14A and 16 in a reduced period of time. Subsequently, it causes the switches 15A and 18 to be opened and causes the switch 15B to be closed, thus connecting the capacitors 14B and 16 into circuit. A composite capacitance $C_2+C_4$ is thus obtained which has a magnitude equal to 1/25 times the composite capacitance $C_1+C_4$. Accordingly, the integrated voltage rises as rapidly as 25 times the previous rate. Assuming that $ASA \times SC/S$ is chosen equal to 3, it may be assumed that an integrating operation in the region $A_2$ permits the reference value $V_3$ to be reached after $T_c$ seconds. The expected exposure period $T_e$ is equal to $T_c \times 25$. It is unnecessary to consider circumstances that the reference value is reached within 20 milliseconds for the operating region $A_2$ shown in FIG. 8 because when $T_c$ is equal to 20 milliseconds, the expected exposure period $T_e$ is equal to $20 \times 10^{-3} \times 25 = 0.5$ second, indicating

| ASA $\left(\frac{ASA \times SC}{S}\right)$ | Capacitance of integrating capacitor | Operating region | Expected exposure period | Photometry technique | Integrating interval $T_c$ | Equation for calculation |
|---|---|---|---|---|---|---|
| 1.5 to 200 | $C_1 + C_4$ | $A_1$ | $T_e \leq \frac{1}{2}$ sec | Direct integration | $T_c = T_e \leq \frac{1}{2}$ sec | — |
|  | $C_2 + C_4$ | $A_2$ | $\frac{1}{2}$ sec $< T_e \leq 1$ min | Calculation | 20 ms $< T_c \leq 2.4$ sec | $T_e = T_c \times 25$ |
|  | $C_4$ | $A_3$ | 1 min $< T_e \leq 100$ min | Calculation | 20 ms $< T_c \leq 2$ sec | $T_e = T_c \times 3000$ |
| 200 to 25600 | $C_3 + C_4$ | $A_4$ | $T_e \leq \frac{1}{2}$ sec | Direct integration | $T_c = T_e \leq \frac{1}{2}$ sec | — |
|  | $C_4$ | $A_5$ | $\frac{1}{2}$ sec $< T_e \leq 2$ min | Calculation | 20 ms $< T_c \leq 4.8$ sec | $T_e = T_c \times 25$ |

Figure 7:
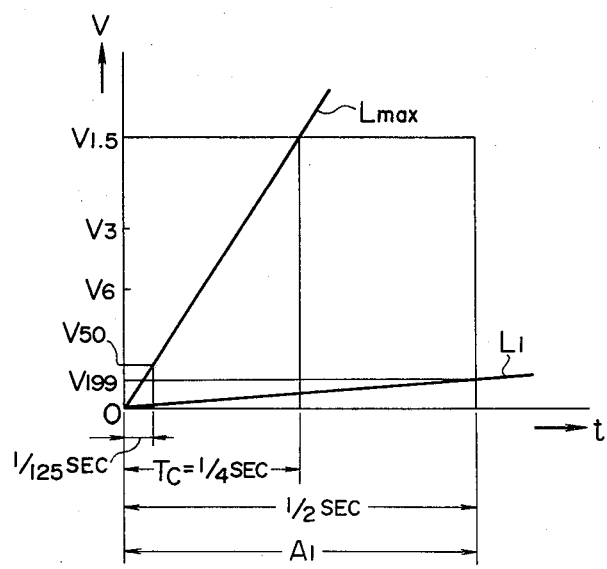
FIGS. 7 to 11 graphically illustrate the operation of the individual regions shown in FIG. 6.

The manner of deriving a required exposure period in the linear region will be more closely described below with reference to FIG. 6 and the table indicated above. FIG. 7 illustrates the operation in the region $A_1$, with an integrating voltage V shown on the ordinate and plotted against time t shown on the abscissa. Since the reference voltage is determined in proportion to $S/(ASA+SC)$ as mentioned previously, the reference value will be reduced for an increased value of ASA. Reference values for $ASA \times SC/S$ of 1.5, 3, 6 ... 199 will be indicated by $V_{1.5}, V_3, V_6 \ldots V_{199}$. For $ASA \times SC/S$ of 1.5, the integrated voltage will reach the reference value $V_{1.5}$ in $\frac{1}{4}$ second for the maximum illuminance $L_{max}$. For the $ASA \times SC/S$ value of 199, the integrated voltage will reach the reference value $V_{199}$ in 0.5 seconds for the illuminance $L_1$. For $ASA \times SC/S$ of 50, the integrated voltage will reach the reference value $V_5$ in 1/125 second for the maximum illuminance $L_{max}$. When a picture is taken under a condition greater than $ASA \times SC/S$ of 50 with the maximum illuminance, the integrated voltage will reach the reference value earlier than 1/125 second. In this instance, the shutter 2 may be operated at a corresponding time, but since it is a rare occurrence that the shutter be closed within a period less than 1/125 when taking a picture with the microscope, an alarm may be given to the user for the time interval less than 1/125 second. When such an alarm is given, the film may be replaced by one having lower film speed or the illumination level may be reduced. No direct photometry takes place in the region $A_1$ as indicated in FIG. 7, so that the exposure can be interrupted at the moment when the integrated voltage reaches the reference value. Accordingly, in this region, the remainder of the exposure period is not displayed.

Figure 8:
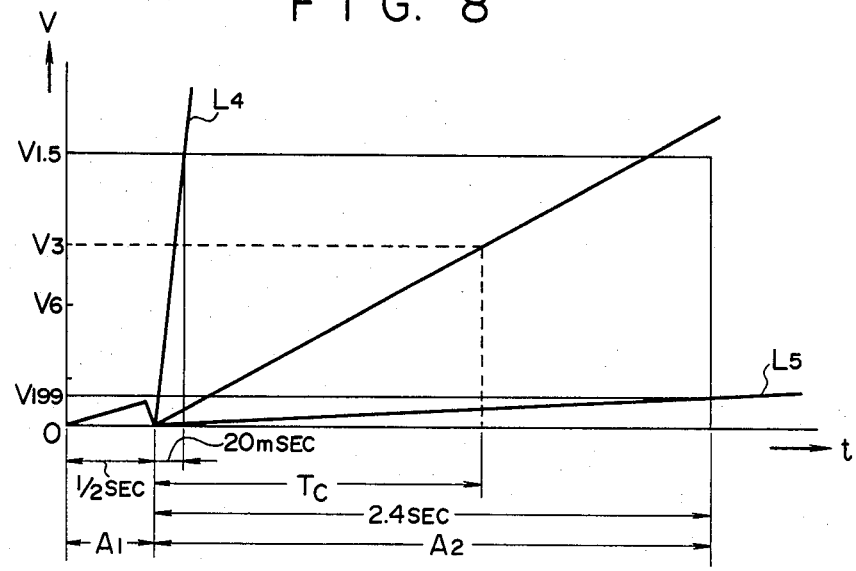

FIG. 8 illustrates the operation in the regions $A_1$ and $A_2$. If the integrated voltage does not reach the reference value in 0.5 seconds which is the photometric that a direct photometry takes place in the region $A_1$. When $ASA \times SC/S$ is chosen equal to 1.5, the reference value $V_{1.5}$ is reached in just 20 milliseconds for the illuminance of $L_4$, so that the maximum illuminance in the region $A_2$ is $L_4$. When $ASA \times SC/S$ is chosen equal to 199, the integrated voltage reaches the reference value in 2.4 seconds for the illuminance of $L_5$. The exposure period $T_e$ in this instance will be equal to $2.4 \times 25 = 60$ seconds or one minute. Accordingly, exposure period $T_e$ which can be determined in the region $A_2$ is $\frac{1}{2}$ second $< T_e \leq$ one minute.

Figure 9:
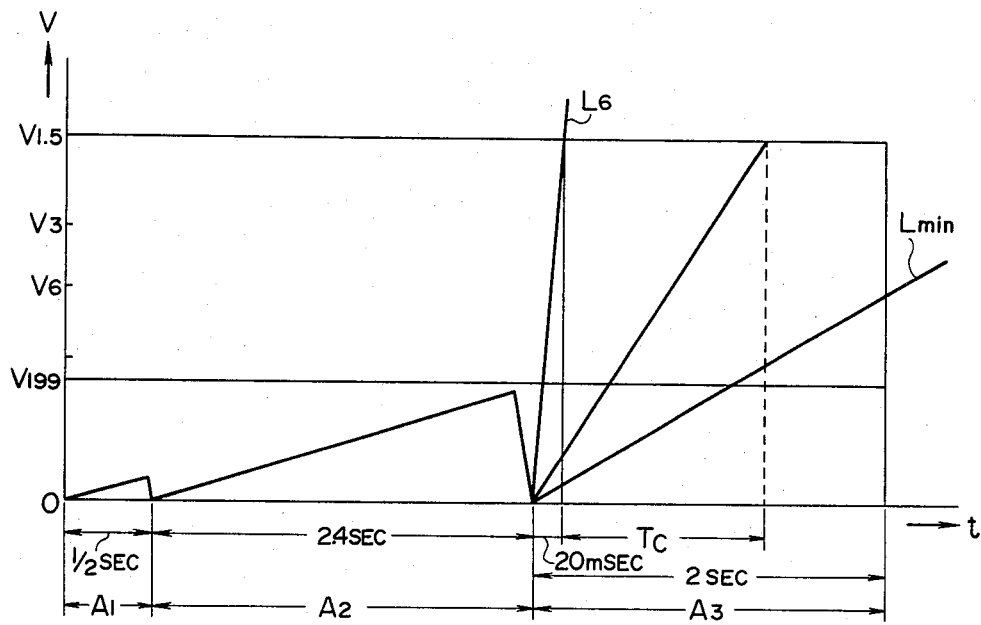

FIG. 9 illustrates the operation in the regions $A_1$, $A_2$ and $A_3$. As will be apparent from FIG. 8, with an illuminance lower than $L_5$, the integrated voltage cannot reach the reference value $V_{199}$ in 2.4 seconds from the initiation of integrating operation if the picture is taken with $ASA \times SC/S = 199$. In such instance, the switch 18 is closed again to discharge capacitors 14B and 16 rapidly, and thereafter the switches 15B and 18 are opened, allowing the capacitor 16 alone to be connected in circuit. The resulting capacitance $C_4$ is less than that of $C_1+C_4$ by a factor of 3000. If the reference value is reached within 20 milliseconds from the initiation of the integrating operation, the photometry can be completed in the region $A_2$. Accordingly, the photometry between the maximum illuminance of $L_6$ and the minimum illuminance $L_{min}$ may be performed in the region $A_3$. Since the longest practical exposure period is chosen equal to 100 minutes = 6000 seconds, the maximum integrating interval $T_c$ in the region $A_3$ is equal to 2 seconds. The reference value may not be reached within the maximum integrating interval associated with the region $A_3$ depending on the ASA film speed and the illuminance involved, but in such instance an alarm may be given to the user to indicate the insufficient value.

Figure 10:
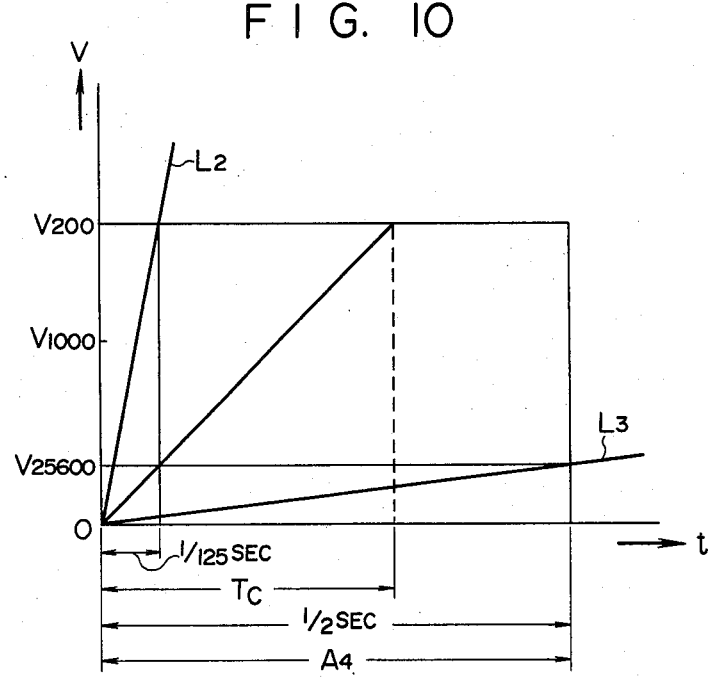

FIG. 10 illustrates the photometric operation in the region A4, which is selected for the first time when taking a picture with ASA×SC/S which is not less than 200. When a value of ASA×SC/S is chosen which is not less than 200, the switch 15C is closed, thus connecting the capacitors 14C and 16 into circuit. The composite capacitance is equal to $C_3 + C_4$. In the region A4, the direct photometry is performed. However, the maximum integrating interval is 0.5 seconds as in the region A1. In the operating region A4, with $ASA \times SC/S = 200$, the reference value $V_{200}$ will be reached in 1/125 second for the illuminance of $L_2$. With $ASA \times SC/S = 25,600$, the reference value $V_{25,600}$ will be reached in 0.5 second for the illuminance of $L_3$.

Figure 11:
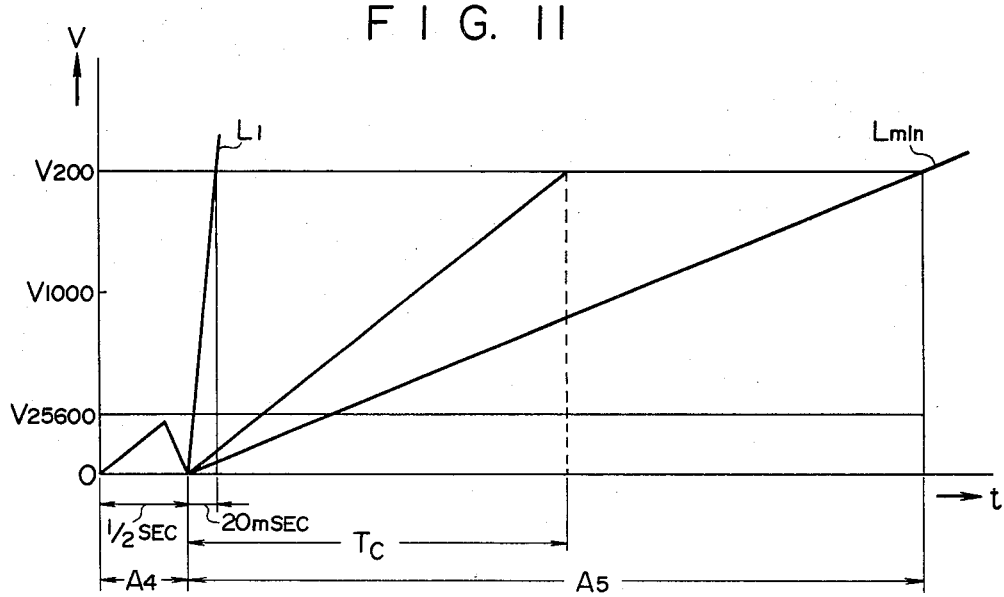

FIG. 11 illustrates the integrating operation in the region A5. When the reference value is not reached in 0.5 seconds as a result of the photometry in the region A4, the switch 18 is closed to discharge the capacitors 14C and 16, and then the switches 15C and 18 are opened to permit an integrating operation by means of the capacitor 16 alone in the region A5. As mentioned previously, the capacitance $C_4$ of the capacitor 16 is less than the composite capacitance $C_3 + C_4$ by a factor of 25. Since the maximum exposure period is chosen to be equal to two minutes or 120 seconds for ASA×SC/S equal to or greater than 200, the maximum integrating interval $T_c$ in the region A5 is 4.8 seconds. Specifically, with ASA×SC/S which is equal to 200, the reference value will be reached by integrating over 4.8 seconds for the illuminance of $L_{min}$. If the reference value is reached within 20 milliseconds, the photometry is possible in the region A4, and hence the limiting value is the illuminance of $L_1$ for ASA×SC/S which is equal to 200. In the region A5, the expected exposure period $T_e$ is equal to 25 times the integrating $T_c$.

As discussed, in accordance with the invention, the calculation control circuit 26 may be utilized to derive the expected exposure period $T_e$ by automatically switching integrating capacitors in and out of the circuit depending on the ASA speed, film characteristics such as SC or S and the illuminance which are supplied to the apparatus before a photographing operation takes place. In the present embodiment, if the integrated voltage reaches the reference value in the region A2, for example, the switch 18 may be immediately closed to discharge the capacitors 14B and 16, and then the switch 18 may be opened to reinitiate the integrating operation. This may be repeated for the interval of the exposure.

As mentioned previously, in accordance with the invention, an equivalent exposure period $T_E$ is subtracted from an expected exposure period $T_e$, which is sequentially calculated, to derive the remainder of the exposure period $T_R$ for display. The remainder of the exposure $T_R$ is derived as indicated in the equation (5). However, when the described integrating circuit 12 and the comparator 21 are used, the second right-hand term of the equation (5) cannot be directly obtained. However, since $K = L(t_i) \cdot T(t_i) = L(t_m) \cdot T(t_m)$, the equation (5) can be rewritten as follows:

$$T_R(t_m) = T_e(t_m) - \sum_{i=1}^{m} \frac{T_e(t_m)}{T_e(t_i)} \times \Delta t_i \tag{18}$$

In this equation, $T_e(t_m)$ represents an expected exposure period at time $t_m$, $T_e(t_i)$ represents an expected exposure period which is derived at time $t_1, t_2 \ldots$, and $\Delta t_i$ represent intervals $t_2-t_1, t_3-t_2 \ldots$. Hence, the remainder of the exposure period $T_e(t_m)$ at time $t_m$ can be calculated.

The present embodiment also effects a correction for the failure of the reciprocity law, which can be practiced only for an increased length of an exposure period. Thus, no correction for the failure of the reciprocity law is made in regions A1 and A4. The direct photometry is effected in these regions intrinsically, and hence any correction for the failure cannot be made. Accordingly, the correction is performed in the regions A2, A3 and A5. In these regions, the remainder of the exposure period $T_R(t_m)$ as represented by the equation (18) can be calculated to effect the correction, and a corrected, expected exposure period $T'_e(t_m)$ can be expressed as follows:

$$T'_e = \alpha T_e(t_m)^\beta \tag{19}$$

Hence, as a result of the correction, the remainder of the exposure period $T'_R(t_m)$ can be expressed as follows:

$$T_R(t_m) = T_e(t_m) - \sum_{i=1}^{m} \frac{T_e(t_m)}{T_e(t_i)} \times \Delta t_i \tag{20}$$

The above has described the manner in which the remainder of the exposure period can be sequentially indicated by the display 8 in the course of taking a picture of the object 1 being photographed in accordance with the invention. The display may be updated after each photometry, or the remainder can be progressively decreased in response to a signal from a timer as the sequential calculation is made. In this instance, it is possible that a display may indicate an increased length for the remainder. After the photographing operation, the actual exposure period can be displayed. This can be performed by applying the actual exposure period read command to the input terminal 31E of the decoder/latch 31. While in the described arrangement, one of the integrating capacitors is normally connected in circuit, it will be understood that all of the capacitors may be switched in and out. Alternatively, a plurality of capacitors may be selectively connected into series or parallel relationship to change the time constant of the integrating operation.

What is claimed is:

1. A photographing apparatus comprising:
   a photoelectric conversion circuit including a photoelectric transducer element which continuously determines the brightness of an object being photographed for producing an output signal which corresponds to the brightness of the object;
   means for sequentially calculating an expected exposure period during the course of a photographing operation in response to said output signal from the photoelectric conversion circuit;
   means for determining an equivalent exposure period from the initiation of the photographing operation to the instant when the expected exposure period has been determined, means for subtracting said equivalent exposure period from said expected exposure period calculated by the calculating means to derive the remainder of the exposure period in a sequential manner;
   means for displaying said remainder of the exposure period during said photographing operation; and
   a shutter drive circuit for opening a shutter at the initiation of the photographing operation and for closing the shutter when the remainder of the exposure period is substantially zero.

2. A photographing apparatus according to claim 1 in which the combination of the means for sequentially calculating the expected exposure period and the means for sequentially deriving the remainder of the exposure period comprises an integrating circuit including a plurality of integrating capacitors which can be selectively switched in and out of circuit for integrating said output signal from the photoelectric conversion circuit, means for producing a reference voltage against which an output signal from the integrating circuit is compared, a comparator for comparing the output signal from the integrating circuit against the reference voltage from said producing means to produce an output signal, and a central processing unit for monitoring said output signal from the comparator for controlling a selective connection of the integrating capacitors in the integrating circuit and for selectively controlling the value of the reference voltage, the central processing unit selectively changing the connection of the integrating capacitors in the integrating circuit when an exposure period of an increased length is involved, thereby controlling the integrating interval of the integrating circuit in order to calculate an exposure period.

3. A photographing apparatus according to claim 2 in which the integrating circuit comprises an operational amplifier, a fixed integrating capacitor connected across an input and an output of the operational amplifier, a plurality of series circuits each including an integrating capacitor and a switch and connected across the input and the output of the operational amplifier, and another series circuit including a resistor and a switch connected across the input and the output of the operational amplifier.

4. A photographing apparatus according to claim 3, further comprising a decoder/latch for storing and decoding a control signal delivered from the central processing unit which is used to control the switches, and a switch drive circuit responsive to an output signal from the decoder/latch to control the opening and closing of the switches.

5. A photographing apparatus according to claim 2 in which the comparator comprises an operational amplifier.

6. A photographing apparatus according to claim 2 in which the circuit for producing the reference voltage comprises a digital-analog converter for receiving digital information delivered from the central processing unit which indicates the value of a reference value and converts it into a corresponding analog reference voltage, and a switch for feeding the output reference voltage from the converter to the comparator.

7. A photographing apparatus according to claim 2, further including means for displaying the expected exposure period.

8. A photographing apparatus according to claim 2 in which the display means is adapted to indicate various information such as the result of calculation by the central processing unit.

9. A photographing apparatus according to claim 2 or 8 in which the display means comprises a display driver for receiving various information, and a display unit driven by the drive circuit for displaying various information.

10. A photographing apparatus according to claim 2, further including a printer drive circuit for receiving various output information from the central processing unit including the result of calculation, and a printer driven by the printer drive circuit for printing out various output information.

11. A photographing apparatus according to claim 2, further including a winding drive circuit responsive to an output signal from the central processing unit, and an automatic film winding device for automatically winding a film in response to an output signal from the winding drive circuit.

12. A photographing apparatus comprising:
means for determining the brightness of an object being photographed and for producing an output signal which corresponds to the brightness of said object utilizing direct photometry;
means for periodically calculating an expected exposure period while an exposure operation is taking place in response to said output signal;
said calculating means including an integrating circuit including a plurality of integrating capacitors which are selectively switched in and out of said integrating circuit for changing the integrating rate of said output signal; and
a shutter drive circuit for opening a shutter at the initiation of the photographing operation and for closing said shutter at the end of said expected exposure period.

13. A photographing apparatus according to claim 12 further including means for displaying said expected exposure period during said photographing operation.

14. A photographing apparatus according to claim 13 further including means for changing the connection of said integrating capacitors in said integrating circuit in order to alter the length of time it takes to calculate the expected exposure period.

15. A photographing apparatus, comprising:
first means for generating a signal during an exposure period which is a function of the brightness of an object being photographed and the light received by said first means, responsive to a shutter opening;
second means for providing a reference voltage;
integrating means for integrating said signal;
said integrating means including means for changing the rate of integration of said signal at any time during said exposure period in response to the light received by said first means;
comparator means for comparing said integrated signal against said reference voltage to generate an output; and
a shutter drive circuit for closing the shutter to provide a proper photographing operation responsive to said comparator output.

16. A method for determining the time for a proper photographing interval to operate a shutter, comprising the steps of:
providing a reference voltage level;
during an exposure period, generating a signal representative of the light being reflected from the object being photographed, responsive to the opening of said shutter;
integrating said signal at a first predetermined rate during said exposure period;
integrating said signal at a second predetermined rate during said exposure period;
comparing said integrated signal with said reference voltage; and
closing said shutter in response to the output of said comparison operation.

17. A photographing apparatus including a shutter, comprising:
   first means for generating a signal which is a function of light received by said first means from the object being photographed, responsive to a shutter opening;
   second means for providing a reference voltage;
   means for periodically calculating an expected exposure period and the remainder of said exposure period during an exposure operation in response to said signal;
   said calculating means including integrating means for integrating said signal at two or more selected rates to reach said reference voltage before the time said shutter should be closed for a proper exposure period; and
   means responsive to said selected integration rates for closing said shutter when the remainder of the exposure period is substantially zero.

18. A method for determining the time for a proper photographing interval to operate a shutter comprising the steps of:
   providing a reference voltage level;
   generating a signal representative of the light being reflected from the object being photographed, responsive to the opening of said shutter;
   periodically calculating an expected exposure period and the remainder of said exposure period during an exposure operation in response to said signal;
   said calculating step including integrating said signal at two or more selected rates; and
   closing the shutter at a time after the integrated signal reaches the reference voltage level, which time is when the remainder of the exposure period is substantially zero.

19. A method in accordance with claim 18 wherein said integrating step includes the steps of integrating said signal at a first integrating rate, and after a predetermined time interval, integrating said signal at a second integrating rate.

20. A method in accordance with claim 19 further including the step of continuously comparing said integrated signal with said reference voltage level so as to determine when said shutter should be closed.

* * * * *

UNITED STATES PATENT AND TRADEMARK OFFICE
CERTIFICATE OF CORRECTION

PATENT NO. : 4,363,541
DATED : December 14, 1982
INVENTOR(S) : Aihara, et al

It is certified that error appears in the above-identified patent and that said Letters Patent is hereby corrected as shown below:

Column 15, line 36, after "integrating", insert

-- interval --.

Column 16, line 17, equation (19), insert prime symbol (') after T, first occurrence only.

lines 21-23, equation (20), insert prime symbols (')

after T, each occurrence (4 times).

Signed and Sealed this

Nineteenth Day of July 1983

[SEAL]

Attest:

GERALD J. MOSSINGHOFF

Attesting Officer    Commissioner of Patents and Trademarks